United States Patent
Watson et al.

(10) Patent No.: US 8,193,505 B2
(45) Date of Patent: Jun. 5, 2012

(54) SYSTEM AND METHOD FOR SCATTER NORMALIZATION OF PET IMAGES

(75) Inventors: Charles C. Watson, Knoxville, TN (US); Larry Byars, Oak Ridge, TN (US); Christian J. Michel, Lenoir City, TN (US); Harold Rothfuss, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 353 days.

(21) Appl. No.: 12/569,051

(22) Filed: Sep. 29, 2009

(65) Prior Publication Data

US 2010/0078568 A1   Apr. 1, 2010

Related U.S. Application Data

(60) Provisional application No. 61/100,921, filed on Sep. 29, 2008.

(51) Int. Cl.
  *G01T 1/164*   (2006.01)
(52) U.S. Cl. ................................. 250/363.03
(58) Field of Classification Search .............. 250/363.03
  See application file for complete search history.

(56) References Cited

U.S. PATENT DOCUMENTS 6,963,065 B2 * 11/2005 Conti et al. ............... 250/252.1
7,129,496 B2 * 10/2006 Stearns et al. ........... 250/363.03

OTHER PUBLICATIONS

Watson, et al., "Scatter/Trues Detection Efficiency Compensation in Scatter Correction of PET Emission Data", 2008 IEEE Nuclear Science Symposium Conference Record.
Ollinger, et al., "Detector Efficiency and Compton Scatter in Fully 3D PET", IEEE Transactions on Nuclear Science, vol. 42, No. 4, Aug. 1995.
Watson, Cahrles, "New, Faster, Image-Based Scatter Correction for 3D PET",IEEE Transactions on Nuclear Science, vol. 47, No. 4, Aug. 2000.
Agostinelli, et al., "GEANT4—a simulation toolkit", Nuclear Instuments and Methods in Physics Reseach A 506 (2003) 250-303.
Bentourkia, et al., "Simultaneous attenuation and scatter corrections in small animal PET imaging", Computerized Medical Imaging and Graphics 33 (2009) 477-488.

* cited by examiner

*Primary Examiner* — Constantine Hannaher
(74) *Attorney, Agent, or Firm* — Peter Kendall

(57) ABSTRACT

In positron emission tomography (PET), a detector's response to scattered radiation may be different from its response to unscattered (true coincidence) photons. This difference should be accounted for during normalization and scatter correction. The disclosure shows that only a knowledge of the ratio of the scatter to trues efficiencies is necessary, however. A system and method are disclosed for measuring the scatter/trues detection efficiency ratio, as well as for applying this compensation during the scatter correction of PET emission data. PET detector efficiencies are measured in two steps, the first using a plane radiation source, and the second using a plane radiation source in combination with a scattering medium. A ratio of the scatter and trues detection efficiency is obtained from this data for each detector/crystal, and is applied as a correction factor to PET data obtained during medical imaging processes.

19 Claims, 14 Drawing Sheets

SYSTEM AND METHOD FOR SCATTER NORMALIZATION OF PET IMAGES

CROSS-REFERENCE TO RELATED APPLICATIONS

This is a non-provisional of pending U.S. Provisional Patent Application Ser. No. 61/100,921, filed Sep. 29, 2008, by Charles C. Watson, et al., the entirety of which application is incorporated by reference herein.

FIELD OF THE DISCLOSURE

The invention relates generally to techniques for nuclear medical imaging, and in particular to techniques for measuring and correcting for variations in relative efficiencies of Positron Emission Tomography (PET) detectors.

BACKGROUND OF THE DISCLOSURE

Nuclear medicine is a unique specialty wherein radiation is used to acquire images which show the function and anatomy of organs, bones or tissues of the body. The technique of acquiring nuclear medicine images entails first introducing radiopharmaceuticals into the body, either by injection or ingestion. These radiopharmaceuticals are preferentially taken up by specific organs, bones or tissues of interest (these exemplary organs, bones, or tissues are also more generally referred to herein using the term "objects".) Upon arriving at their specified area of interest, the radiopharmaceuticals produce gamma photon emissions which emanate from the body and are then captured by a scintillation crystal. The interaction of the gamma photons with the scintillation crystal produces flashes of light which are referred to as "events." Events are detected by an array of photo detectors (such as photo-multiplier tubes) and their spatial locations or positions are then calculated and stored. In this way, an image of the organ or tissue under study is created from detection of the distribution of the radioisotopes in the body.

One particular nuclear medicine imaging technique is known as positron emission tomography, or PET. PET is used to produce images for diagnosing the biochemistry or physiology of a specific organ, tumor or other metabolically active site. The measurement of tissue concentration using a positron emitting radionuclide is based on coincidence detection of the two gamma photons arising from a positron annihilation. When a positron is annihilated by an electron, two 511 keV gamma photons are simultaneously produced and travel in approximately opposite directions. Gamma photons produced by an annihilation event can be detected by a pair of oppositely disposed radiation detectors capable of producing a signal in response to the interaction of the gamma photons with a scintillation crystal. Annihilation events are typically identified by a time coincidence between the detection of the two 511 keV gamma photons in the two oppositely disposed detectors (i.e., the gamma photon emissions are detected virtually simultaneously by each detector). When two oppositely disposed gamma photons each strike an oppositely disposed detector to produce a time coincidence event, they also identify a line(s)-of-response (LOR) along which the annihilation event has occurred. An example of a PET method and apparatus is described in U.S. Pat. No. 6,858,847, which patent is incorporated herein by reference in its entirety.

After being sorted into parallel projections, the LOR defined by the coincidence events are used to reconstruct a three-dimensional distribution of the positron-emitting radionuclide within the patient. In two-dimensional PET, each 2D transverse section or "slice" of the radionuclide distribution is reconstructed independently of adjacent sections. In fully three-dimensional PET, the data are sorted into sets of LOR, where each set is parallel to a particular detector angle, and therefore represents a two dimensional parallel projection p(r, s, $\phi$, $\theta$) of the three dimensional radionuclide distribution within the patient—where "r" and "s" correspond to the radial and axial distances, respectively, of the LOR from the center of the projection view and "$\phi$" and "$\theta$" correspond to the azimuthal and polar angles, respectively, of the projection direction with respect to the z axis in (x, y, z) coordinate space (in other words, $\phi$ and $\theta$ correspond to a particular LOR direction).

Coincidence events are integrated or collected for each LOR and stored in a sinogram. In this format, a single fixed point in the emitter distribution f(x, y) traces a sinusoid in the sinogram. Each row of a sinogram contains the LOR data for a particular azimuthal angle $\phi$; each element of the row corresponds to a distinct radial offset of the LOR from the center of rotation of the projection. Different sinograms may have corresponded to projections of the tracer distribution at different coordinates along the scanner axis and/or different polar angles with respect to the scanner's axis.

FIG. 1 shows an embodiment of an exemplary PET system. A subject 4, for example a patient, is positioned within a detector ring 3 comprising photo-multiplier tubes (PMTs) 5. In front of the PMTs 5 are individual crystals 8, also called detectors 8. A group of four PMTs may have an array of detectors 8 in front of them. For example, an array of eight by eight or thirteen by thirteen detectors 8 (crystals) is possible, but any other array may be selected. Each detector 8 may be an individual crystal in front of respective PMT. As noted, during an annihilation process two photons 7 are emitted in diametrically opposing directions as schematically illustrated in circle 6. These photons 7 are registered by the PET as they arrive at detectors 8 in the detector ring 3. After the registration, the data, resulting from the photons 7 arriving at the detectors 8, may be forwarded to a processing unit 1 which decides if two registered events are selected as a so-called coincidence event. All coincidences are forwarded to the image processing unit 2 where the final image data may be produced via mathematical image reconstruction methods. The image processing unit 2 may be connected to a display for displaying one or more processed images to a user.

To accurately reconstruct PET data into a usable image, one must know the efficiencies of the detectors that collected them, in order to compensate for their variability. This is often done by placing a thin planar emission source producing negligible scatter in the scanner and comparing the measured responses along lines of response (LOR) normal to the source to the expected uniform responses. Clinical emission data inevitably include scattered radiation along with the unscattered true coincidences ("trues"), however. Scattered radiation and true coincidences are shown in FIG. 2. This scattered radiation may have angular and energy distributions different from those of the unscattered true coincidence photons, and therefore it is likely that the probability of detecting it will also be different from the trues. Because the relative amount and distribution of the scattered radiation varies with the object being imaged, its distinct detection efficiency must be accounted for separately from the trues efficiency.

If M represents a measured response for a detector pair forming an LOR, then neglecting random coincidences, M can be expressed in terms of the incident trues (T) and scattered (S) radiation as:

$$M = \epsilon_T T + \int \epsilon(E,\phi) S(E,\phi) dE d\phi$$

where $\epsilon_T$ and $\epsilon(E,\phi)$ are the detection efficiencies for trues and scatter, respectively, and E and $\phi$ are the energy and incidence angle of the scattered radiation. Since there are two photons and two detectors involved for each LOR, the integral actually involves both energies and both incidence angles, but this is left implicit for notational simplicity.

We can write this equation in terms of the integral scatter flux $S=\int S(E,\phi)dEd\phi$ as $$M=\epsilon_T T+\epsilon_S S$$

where the average scatter efficiency for the LOR is:

$$\epsilon_S = \frac{\int \epsilon(E,\phi)S(E,\phi)dEd\phi}{\int S(E,\phi)dEd\phi}.$$

Because $S(E,\phi)$ is object dependent. $\epsilon_S$ may be also.

It is not obvious how one can determine $\epsilon_S$ directly since, for a source in the field of view (FOV) of the scanner, scatter is nearly always accompanied by true events. Ollinger proposed a partial solution to this problem in "Detector efficiency and compton scatter in full 3D PET," *IEEE Trans. Nuc. Sci.*, vol. 42, pp, 1168-1173, August 1995. He wrote the scatter detection efficiency ($\eta^S_{ijk}$ in his notation) as the product of three components: the plane efficiency $c^S_K$, the detector efficiency $\epsilon_{ijk}$ and the geometrical efficiency $g_{ijk}$:

$$\epsilon_S = \eta^S_{ijk} = c^S_k \epsilon_{ijk} g_{ijk}.$$

He proposed to use the same values of $\epsilon_{ijk}$ for scatter as for trues, since he had no way of independently measuring them. He proposed to estimate the plane efficiencies by comparing measured to computed scatter in the tails of a sinogram of a uniform cylindrical phantom, although the scattered radiation in the tails may have a different energy and angular distribution than the scatter in the LORs passing through the object. He assumed $g_{ijk}$ was equal to 1 everywhere, based on heuristic arguments. Finally, Ollinger treated $\eta^S_{ijk}$ as object independent, and thus no components of it were included in the scatter simulation.

The approach to scatter normalization is different in the single scatter simulation (SSS) algorithm, as described in "New, faster, image-based scatter correction for 3D PET," C. C. Watson, *IEEE Trans. Nuc. Sci.*, vol. 47, pp. 1587-1594, August 2000, the entirety of which is incorporated by reference. From (2) the normalized measured (randoms corrected) data is:

$$\frac{1}{\epsilon_T}M = T + \frac{\epsilon_S}{\epsilon_T}S,$$

so the trues may be estimated by $$\hat{T} = \frac{1}{\epsilon_T}M - \left(\frac{\epsilon_S}{\epsilon_T}S\right)_{SSS}.$$

Therefore scatter correction does not require independent knowledge of $\epsilon_S$ and $\epsilon_T$, but only of their ratio. This is an advantage since first order effects in the variation of crystal efficiencies cancel out. The SSS algorithm includes an estimate of the detection efficiency of each simulated photon as a function of its energy and incidence angle. It also estimates the trues efficiency and forms their ratio so that the output of the SSS algorithm is an estimate of $$\frac{\epsilon_S}{\epsilon_T}S = \frac{1}{\epsilon_T}\int \epsilon(E,\phi)S(E,\phi)dEd\phi,$$

for the object-dependent scatter flux.

To the extent that this internal model is accurate, no separate normalization of the scatter is required. This model explicitly accounts for possible variations in the geometrical efficiency for scatter, and allows for its object dependence. There are limitations to this model, however, because it does not include an exact description of the detectors' structure. For example, although most modern PET scanners use pixelated block detectors, gaps that may exist between detector blocks are neglected in the model. These gaps may result in undesirable artifacts in the ultimate image.

It would be useful, therefore, to have a means of measuring and correcting for variations in the $\epsilon_S/\epsilon_T$ ratio which is not accounted for in the simulation. Although there may be random residual variations in individual crystal intrinsic efficiency ratios, the focus is on the variations associated with the geometrical structure of the detectors, i.e. those that depend only on the location of the crystals within the block detector, and the location of the block detectors within the scanner. For a uniform ring scanner only one azimuthal projection angle needs to be considered, due to symmetry.

SUMMARY OF THE DISCLOSURE

The disclosed method estimates such a correction by making two measurements of a known object, one without significant scatter present like a standard plane source, and a second one that includes scattering media.

A method is disclosed for processing medical imaging emission data, the method comprising: obtaining data representative of a targeted patient tissue region using a positron emission tomography (PET) device; processing the data by applying a scatter correction to the data to obtain processed image data, where the scatter correction comprises applying a measured correction factor for the ratio of scatter detection efficiency to trues detection efficiency of at least one detector of the PET device to a numerical estimate of the scatter, and either: (a) subtracting this normalized estimate of the scatter from the data, or (b) otherwise using the normalized estimate of the scatter in an image reconstruction process; and representing an image of the targeted patient tissue region on a display, wherein the image is obtained using the processed image data.

A system is disclosed for processing medical imaging emission data, the system comprising an imaging system including a PET device having a plurality of detectors, a processing unit connected to and in communication with the imaging system and display, and a machine-readable storage medium encoded with a computer program code such that, when the computer program code is executed by a processor, the processor performs a method comprising: obtaining data representative of a targeted patient tissue region using the PET device: processing the data by applying a scatter correction to the data to obtain processed image data, where the scatter correction comprises applying a measured correction factor for the ratio of scatter detection efficiency to trues detection efficiency of at least one detector of the plurality of detectors to a numerical estimate of the scatter, and either: (a) subtracting this normalized estimate of the scatter from the data, or (b) otherwise using it in the reconstruction process.

BRIEF DESCRIPTION OF THE DRAWINGS

The accompanying drawings illustrate preferred embodiments of the disclosure so far devised for the practical application of the principles thereof, and in which.

DETAILED DESCRIPTION

Figure 1:
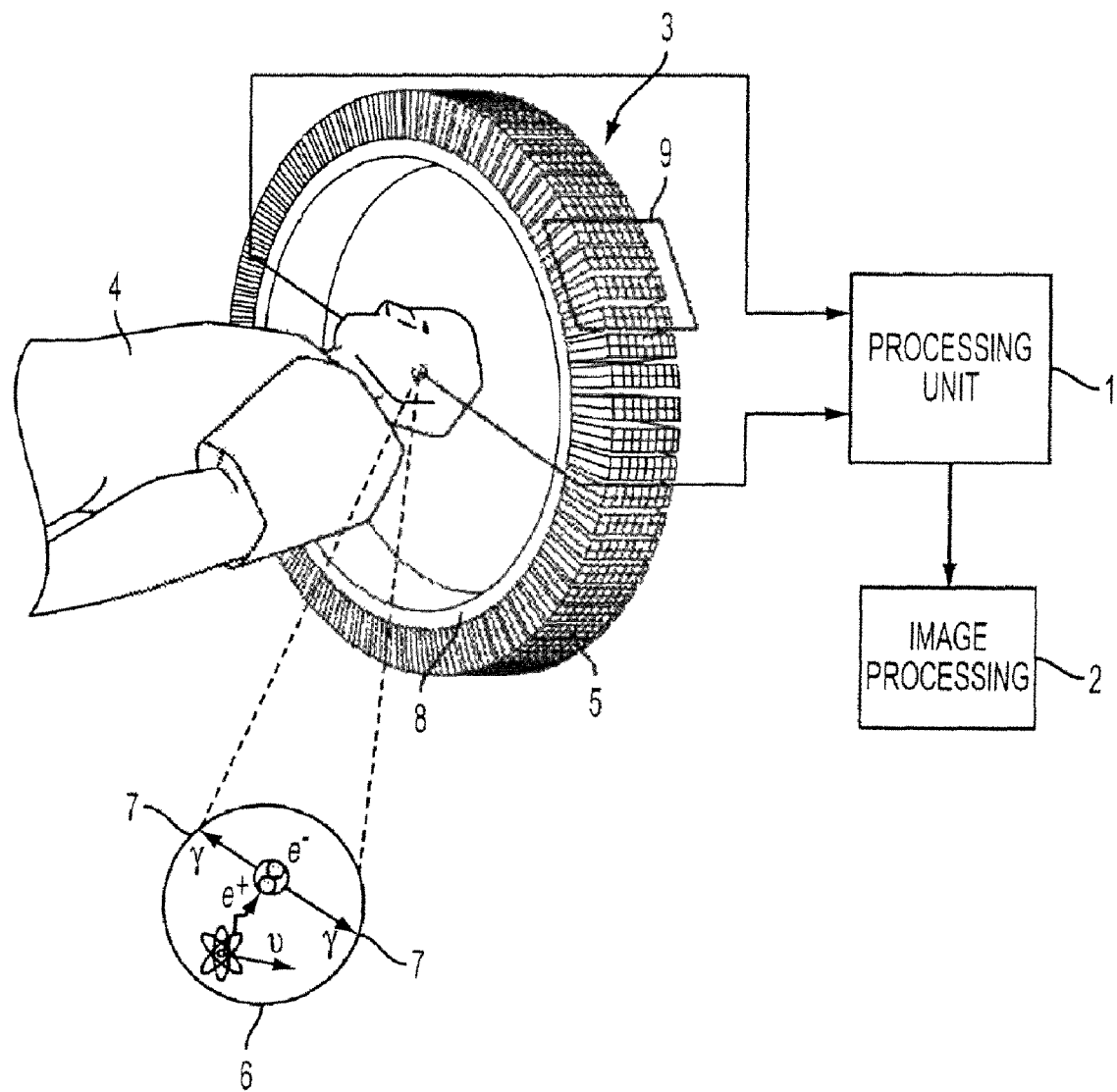
FIG. 1 is a schematic of a PET system.
Figure 2:
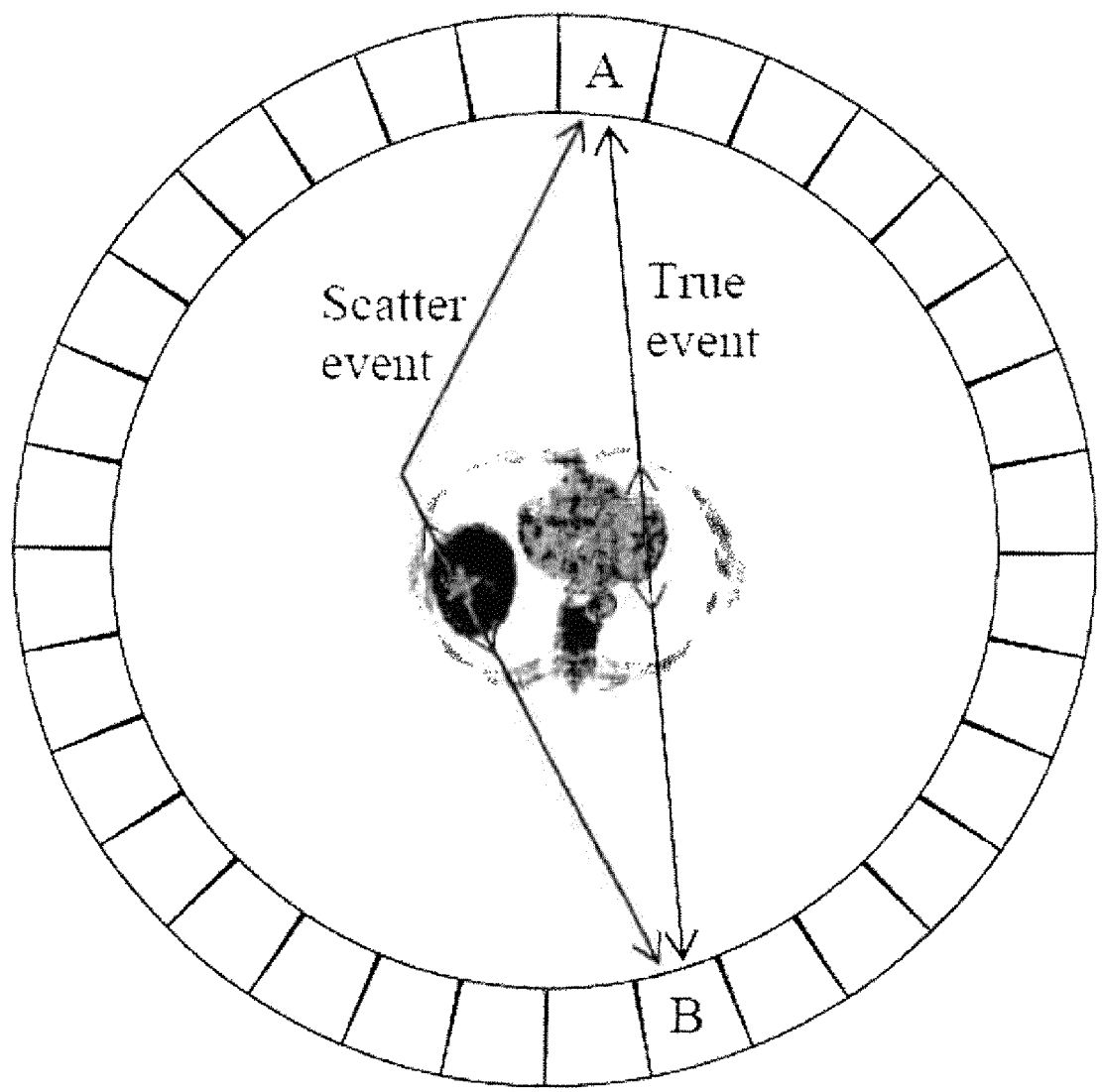
FIG. 2 is an illustration of scatter and true events as detected by an exemplary PET system.

A system and method are disclosed for normalizing measured data from PET devices in which the normalization takes into consideration block structure and/or gaps inherent in PET devices. The disclosed system and method measure scatter detection efficiency variations due to detector geometry or other reasons, and compensate for such scatter efficiency variations during image processing.

As previously noted, to compensate for the variability between individual detectors of a PET device, the efficiencies of the detectors are needed. Thus, a thin planar emission source 10 producing negligible scatter (FIG. 3) is placed in the detector ring 3 and the measured responses of the detectors 8 along lines of response (LOR) normal to the source are compared to expected uniform responses. Similarly, the effects due to scattered radiation can be measured by placing non-activated plastic blocks 12 adjacent to the plane source 10. This technique can be used to estimate scatter/trues efficiency correction factor $\epsilon_C$.

Let $M_1$ be the measurement with bare plane source, and $M_2$ be the measurement with plastic blocks added. If the blocks have a total thickness of $\Delta x$ and a linear attenuation coefficient of $\mu$, then for an LOR normal to the plane source 10, $$M_1 = \epsilon_T T$$

$$M_2 = \epsilon_T e^{-\mu \Delta x} T + \epsilon_S S.$$

If the attenuation factor $e^{-\mu \Delta x}$ is accurately known, it can be applied to $M_1$ and the product divided into $M_2$ to give $$\frac{M_2}{e^{-\mu \Delta x} M_1} - 1 = \frac{\epsilon_S}{\epsilon_T} \left( \frac{S}{e^{-\mu \Delta x} T} \right).$$

This is just the scatter/trues ratio for the slab phantom scan. Since $e^{-\mu \Delta x} T$ should be constant over the normal projection for this phantom, this ratio should be proportional to the SSS estimate of scatter for this projection. Any deviations between the two, aside from an overall scale factor representing $e^{-\mu \Delta x} T$, could be attributed to unmodeled variation in the $\epsilon_S/\epsilon_T$ ratio. In fact, there may be other inaccuracies in the simulation as well, but because of the nature of the physical models used in SSS, such errors are expected to be spatially smooth at the scale of the block detectors. Because the primary concern is with those deviations due to block-level variations in detector efficiencies rather than longer-scale modeling errors, it should be adequate to use a simple analytical function such as a polynomial to model the overall trend of the scatter locally. A scatter/trues efficiency correction factor can be determined from the ratio:

$$\epsilon_C = \left( \frac{M_2}{e^{-\mu \Delta x} M_1} - 1 \right) \bigg/ \left[ \frac{\epsilon_S}{\epsilon_T} \left( \frac{S}{e^{-\mu \Delta x} T} \right) \right]_{model}.$$

To the extent that there are block effects on the scatter/trues efficiency ratio, $\epsilon_C$ should differ from 1. Once $\epsilon_C$ is determined in this way, it can be applied as an independent "normalization" of the SSS estimated scatter, so that $$\hat{T} = \frac{1}{\epsilon_T} M - \left( \frac{\epsilon_S}{\epsilon_T} S \right)_{SSS}.$$

becomes $$\hat{T} = \frac{1}{\epsilon_T} M - \epsilon_C \left( \frac{\epsilon_S}{\epsilon_T} S \right)_{SSS}.$$

Of course, it may be that $C_c$ itself is object dependent to some extent, but it is believed that this is a third-order effect.

Example

Initial measurements were made on a prototype machine having six 38 cm diameter rings of 32 block detectors, each 3×3 cm in dimension, consisting of a 12×12 array of 2.5×2.5× 20 mm LSO crystals. There were gaps between the blocks of about 7 mm transaxially and 2 mm axially. Two plane source scans were performed, one with and one without the plastic blocks. The two plastic slabs were PMMA, each 2.5 cm thick. PMMA has a density of 1.19 g/cc and a linear attenuation coefficient at 511 keV of 0.111 cm$^{-1}$. The total attenuation factor for the slabs is thus 0.574. The energy window was 400-650 keV.

Two approaches were used for analyzing the data. In the first, the data were histogrammed into sinograms with 256 radial bins and 192 projection angles. To reduce noise, the sinograms were summed over all planes and oblique segments. As a consequence, only average transaxial variations in the efficiencies could be estimated. In the second approach the physical LOR data were analyzed before they were combined into the smaller number of virtual LORs in the sinograms. Substantial noise reduction was achieved by exploiting data symmetries. First the data was averaged over all detector block pairs having the same radial and axial offsets.

A further significant noise reduction came from assuming that there are only a few unique LORs within a block-block pair, determined by the location of the two crystals within the block. For the results described below only corner, edge, and central crystals were distinguished, leading to only six unique crystal-crystal, or LOR, types among the $144^2=20736$ possible pairs for two 12×12 blocks. The scatter/trues ratio of:

$$\frac{M_2}{e^{-\mu\Delta x}M_1} - 1 = \frac{\epsilon_S}{\epsilon_T}\left(\frac{S}{e^{-\mu\Delta x}T}\right).$$

for each of these six unique LOR types was averaged over all similar LORs within each unique block pair. Finally, $\epsilon_C$ was estimated for each LOR by normalizing it to the center-center LOR type, effectively assuming $\epsilon_C=1$ for these crystal pairs. These LOR-based $\epsilon_C$ maps were then sorted into sinograms for application to scatter correction. To compare the sinogram based and LOR based estimations of $\epsilon_C$ both analyses were performed on a second experimental data set, similar to the one described above, but in this case with a total thickness of PMMA slabs of 10 cm rather than 5 cm for the slab phantom scan.

Although the plane source used was weak and count rates low, they were necessarily different for the two scans, so the possibility of count rate induced variations in detector response which could possible confound the interpretation of the data in terms of scatter/trues efficiency variations cannot be excluded. To address this issue, a Monte Carlo simulation for this scanner geometry, including a detector response model incorporating block gaps, was performed for a 20 cm cylindrical activated water phantom, using Geant4 (for GEometry ANd Tracking). Scattered and unscattered events were tallied separately, so that their detection efficiencies could be compared, similar to the plane source measurements.

The impact of the scatter/trues efficiency compensation on images was evaluated on synthetic data to eliminate effects of noise and other artifacts. A 20 cm uniform 68Ge cylinder centered in the BrainPET was modeled, and the scatter sinogram for this object was computed using the standard SSS algorithm. This scatter sinogram was attenuation corrected and reconstructed using filtered back-projection (FBP) both with and without applying the $\epsilon_C$ compensation to the scatter first. Gaps in the $\epsilon_C$ sinogram were filled with the value 1. Because FBP is a linear algorithm, and the trues and scatter are additive, scatter correction may be equivalently performed in either projection or image space. Thus a synthetic image can be estimated containing the uncorrected effects of $\epsilon_C$ from $$I_{\epsilon_C} = I_{ideal} + FBP\left[a(\epsilon_C - 1)\left(\frac{\epsilon_S}{\epsilon_T}S\right)_{SSS}\right],$$

where a represents the attenuation correction factors, $I_{ideal}$ is the ideal uniform cylinder image, and $I_{\epsilon_C}$ is the image that would be expected if block-related scatter/trues efficiency variations were present in the data, but not compensated for during scatter correction. This image was computed using the LOR-based estimate of $\epsilon_C$.

Figure 4:
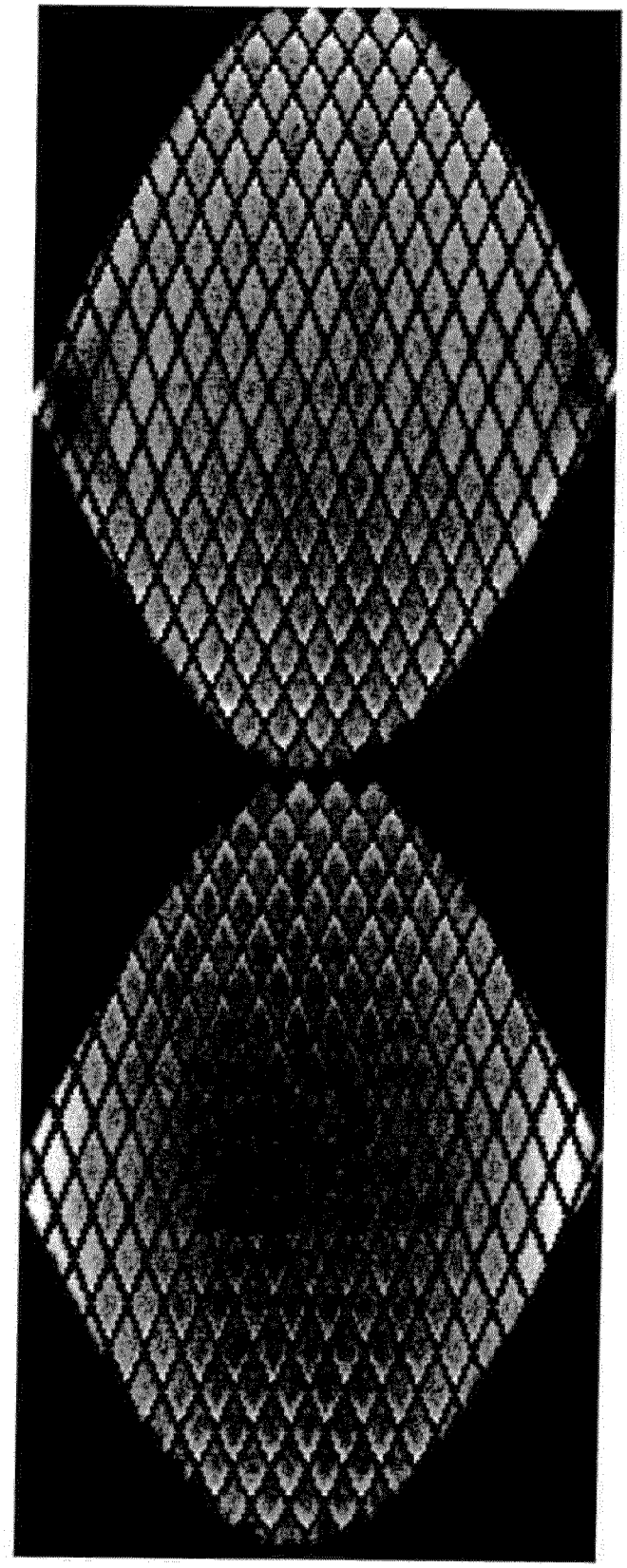
FIG. 4 shows an attenuated plane source sinogram (left) and a slab phantom sinogram (right)
Figure 5:
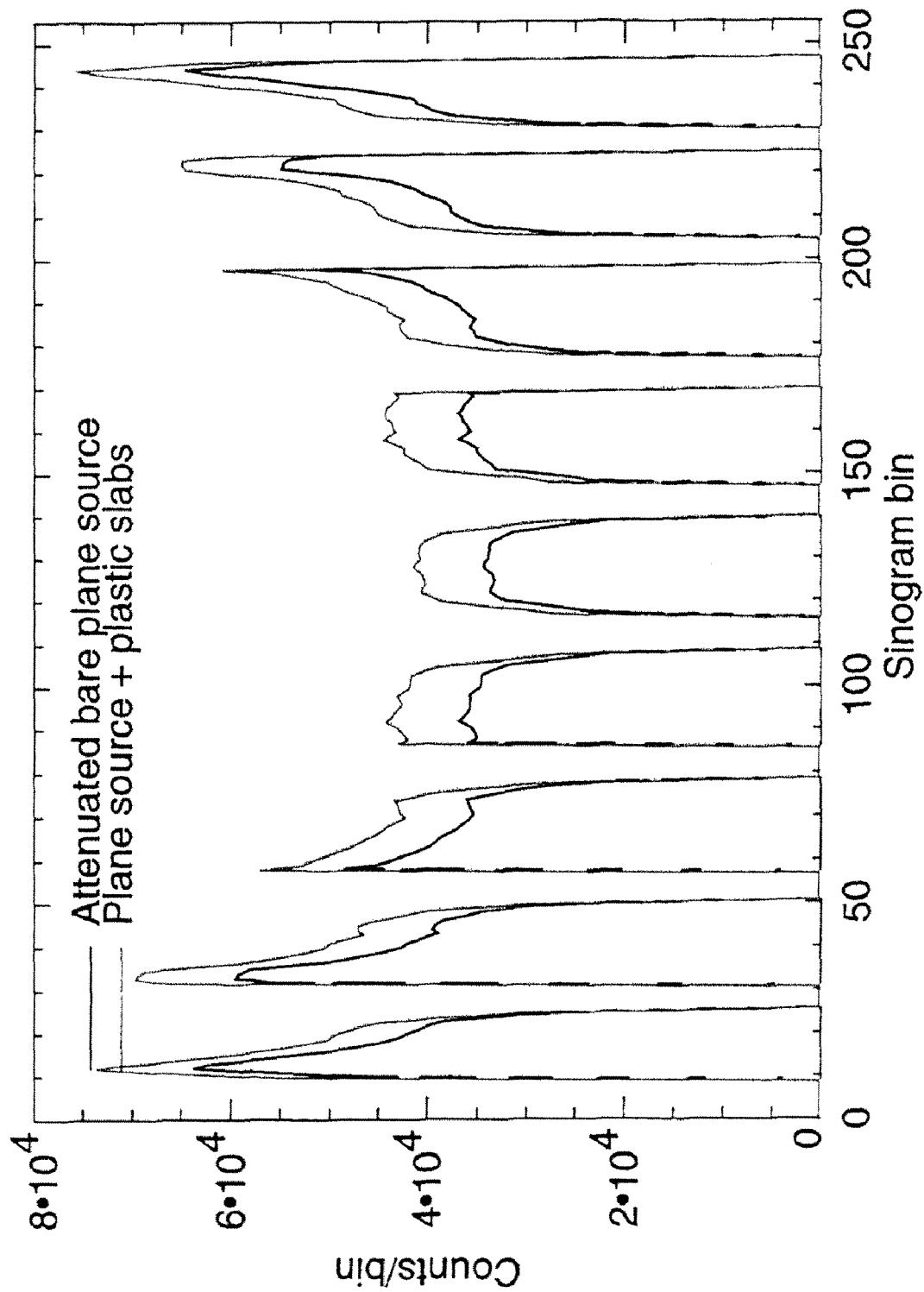
FIG. 5 is a sinogram profile for a plane source with and without plastic slabs, in which the bare plane source profile has been scaled by 0.574.

The summed sinograms for the sinogram-based estimate are shown in FIG. 4. The bare plane source data has been scaled by 0.574, and the greyscale is the same for the two sinograms. The diagonal stripes are due to the block gaps in the tomographic direction. FIG. 5 shows profiles along the central rows of these sinograms. Note the significant variations in efficiencies across the block-block coincidence diamonds.

Figure 3:
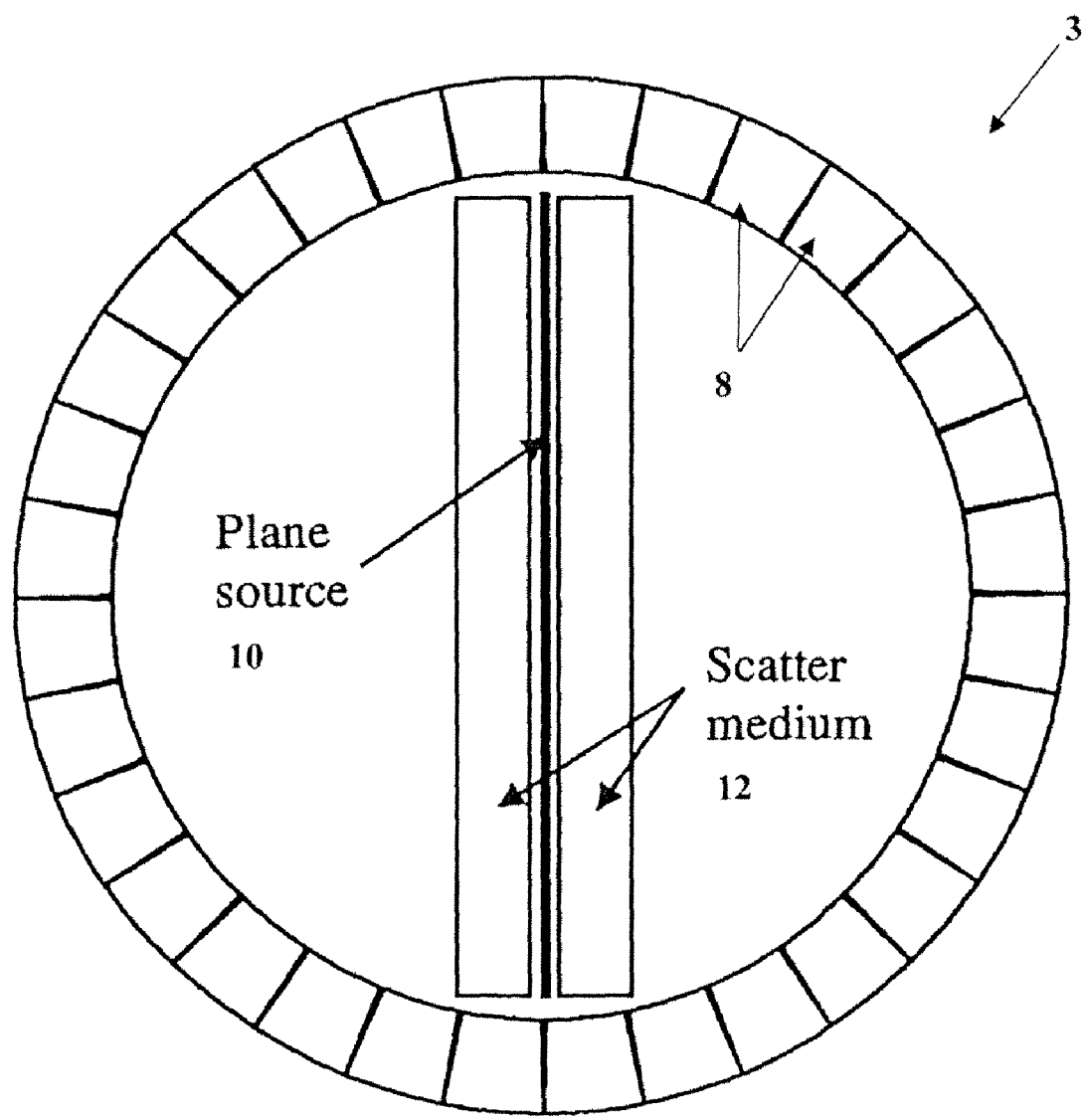
FIG. 3 is a plan view of a scatter/trues efficiency measurement apparatus.
Figure 6:
FIG. 6 is an estimated scatter/trues ratio sinogram.

FIG. 6 shows the scatter/trues ratio sinogram estimated from the sinograms of FIG. 3 according to:

$$\frac{M_2}{e^{-\mu\Delta x}M_1} - 1 = \frac{\epsilon_S}{\epsilon_T}\left(\frac{S}{e^{-\mu\Delta x}T}\right).$$

Figure 8:
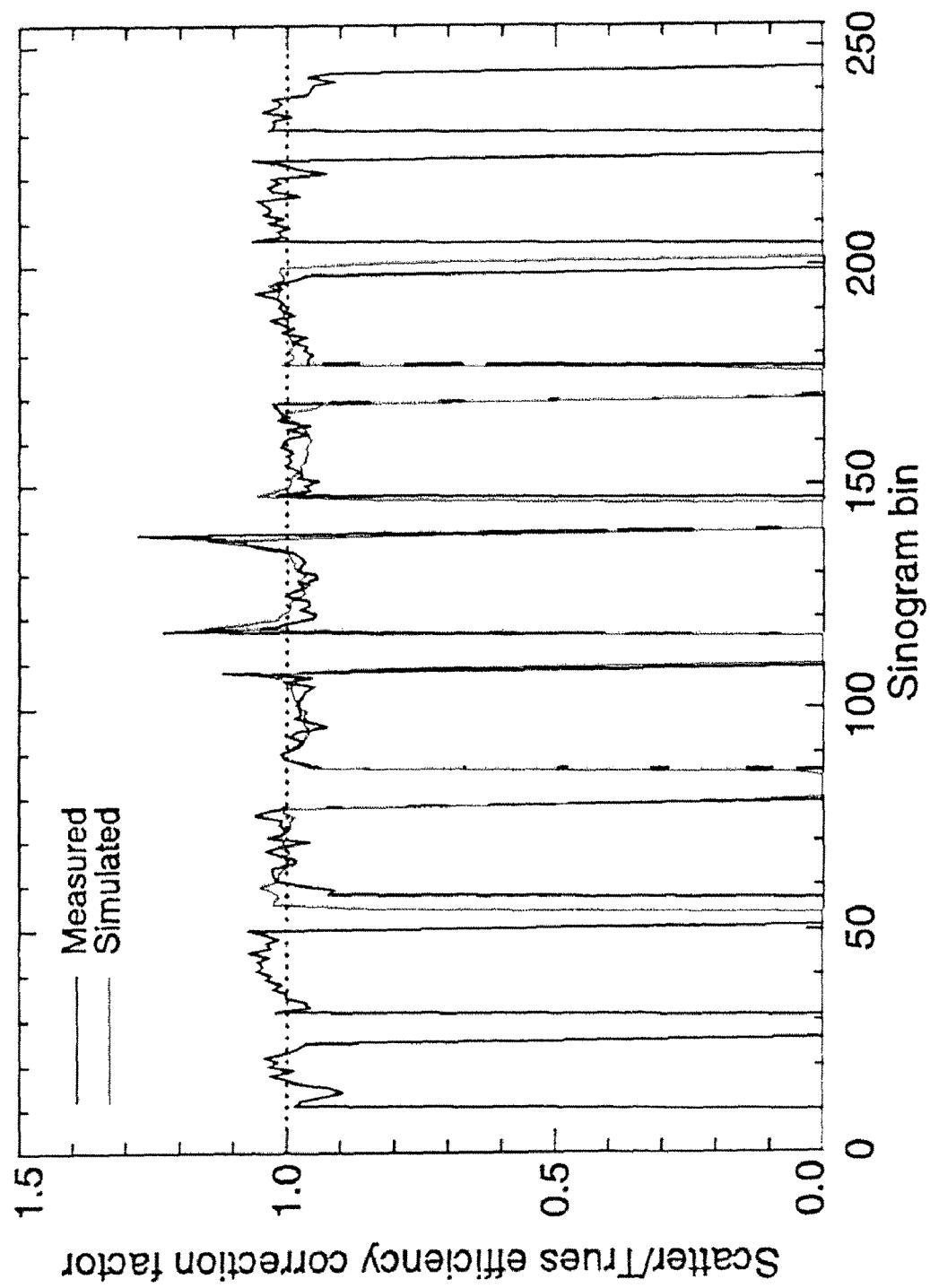
FIG. 8 is an estimated scatter/trues efficiency correction factor.

Only the central portion of this sinogram, where the LORs are nearly normal to the plane source, is of interest. FIG. 6 shows a profile along the central row, together with the smooth model for the scatter/trues ratio. Note that most of the structure seen in the profiles of FIG. 5 cancels out in their ratio. The ratio of the measured and modeled scatter/trues is shown in FIG. 8. This should represent $\epsilon_C$ as in $$\epsilon_C = \left(\frac{M_2}{e^{-\mu\Delta x}M_1} - 1\right) \bigg/ \left[\frac{\epsilon_S}{\epsilon_T}\left(\frac{S}{e^{-\mu\Delta x}T}\right)\right]_{model}.$$

Figure 9:
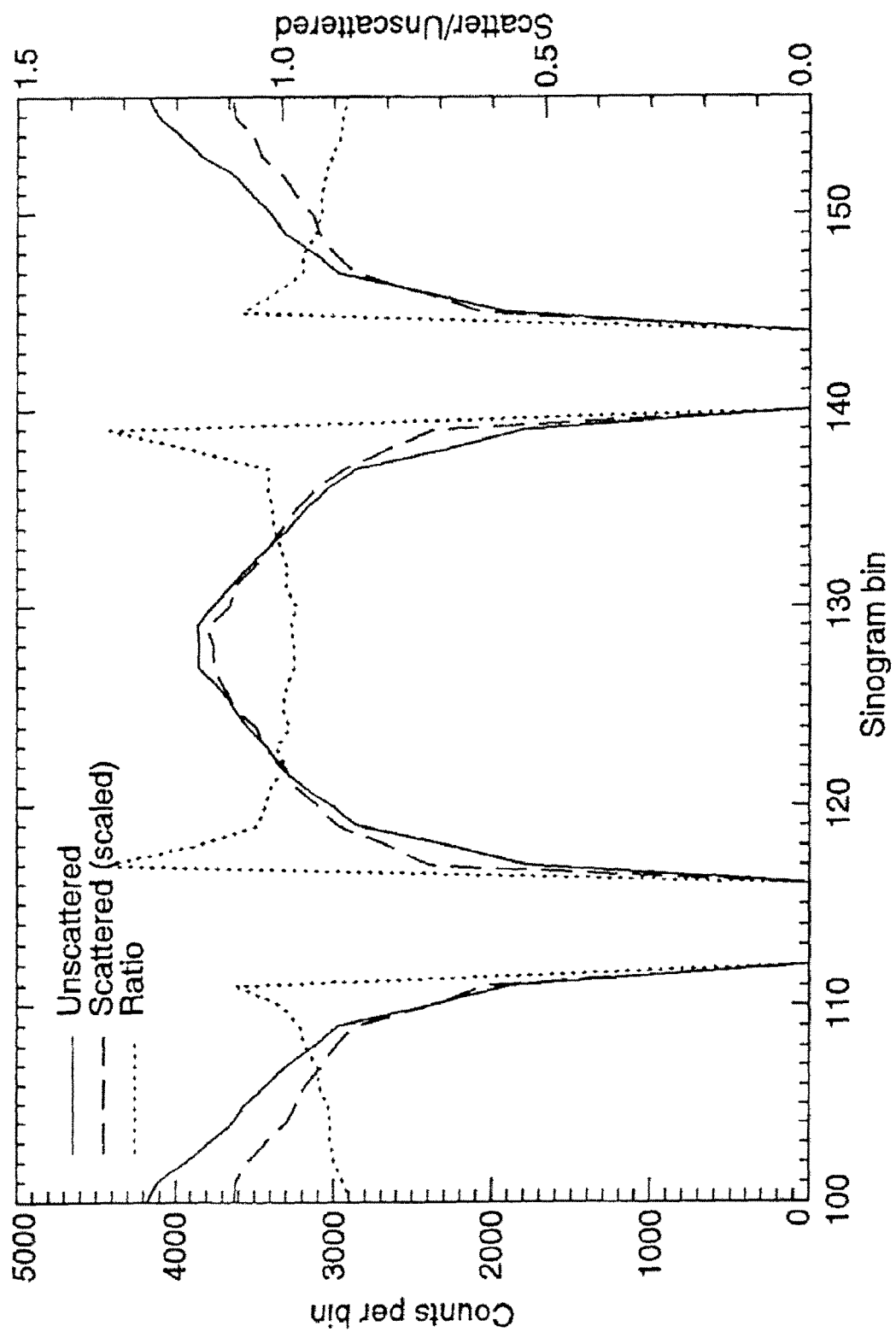
FIG. 9 shows simulation results for a sinogram profile through a central diamond, comparing the scattered and unscattered events.

The correction factor is greater than 1.2 in the vicinity of the edges of the central block-block coincidence diamond. The simulated profile (light grey lines) is derived in a similar way from the Monte Carlo simulation, and is consistent with the results from the measured data. The slight difference in the block gap position at large radius is due to a difference in the way the measured and simulated data were histogrammed. The simulation results are shown in more detail in FIG. 9. These are profiles across the central block diamond of the scattered and unscattered events, and their ratio. The scattered event profile has been scaled to match the trues.

Figure 10:
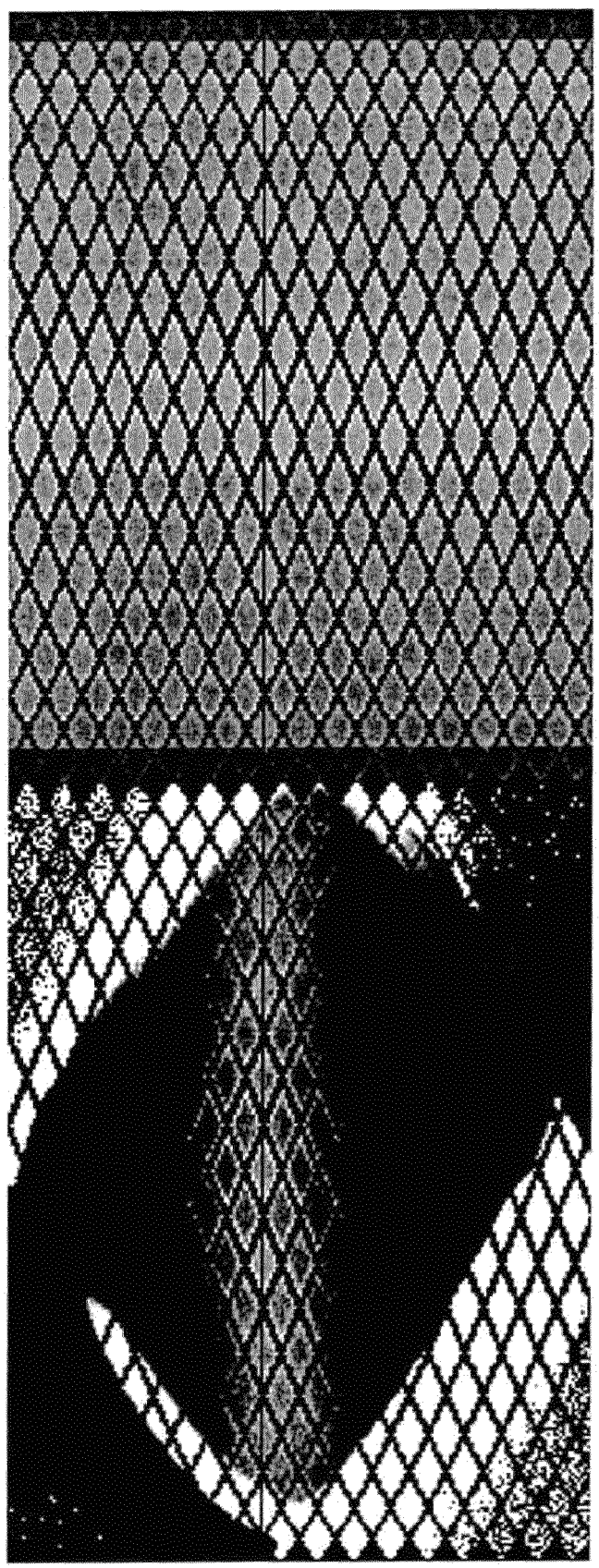
FIG. 10 shows scatter/trues efficiency correction factor sinograms in which the left most image is sinogram-based and the right most image is LOR-based.
Figure 11:
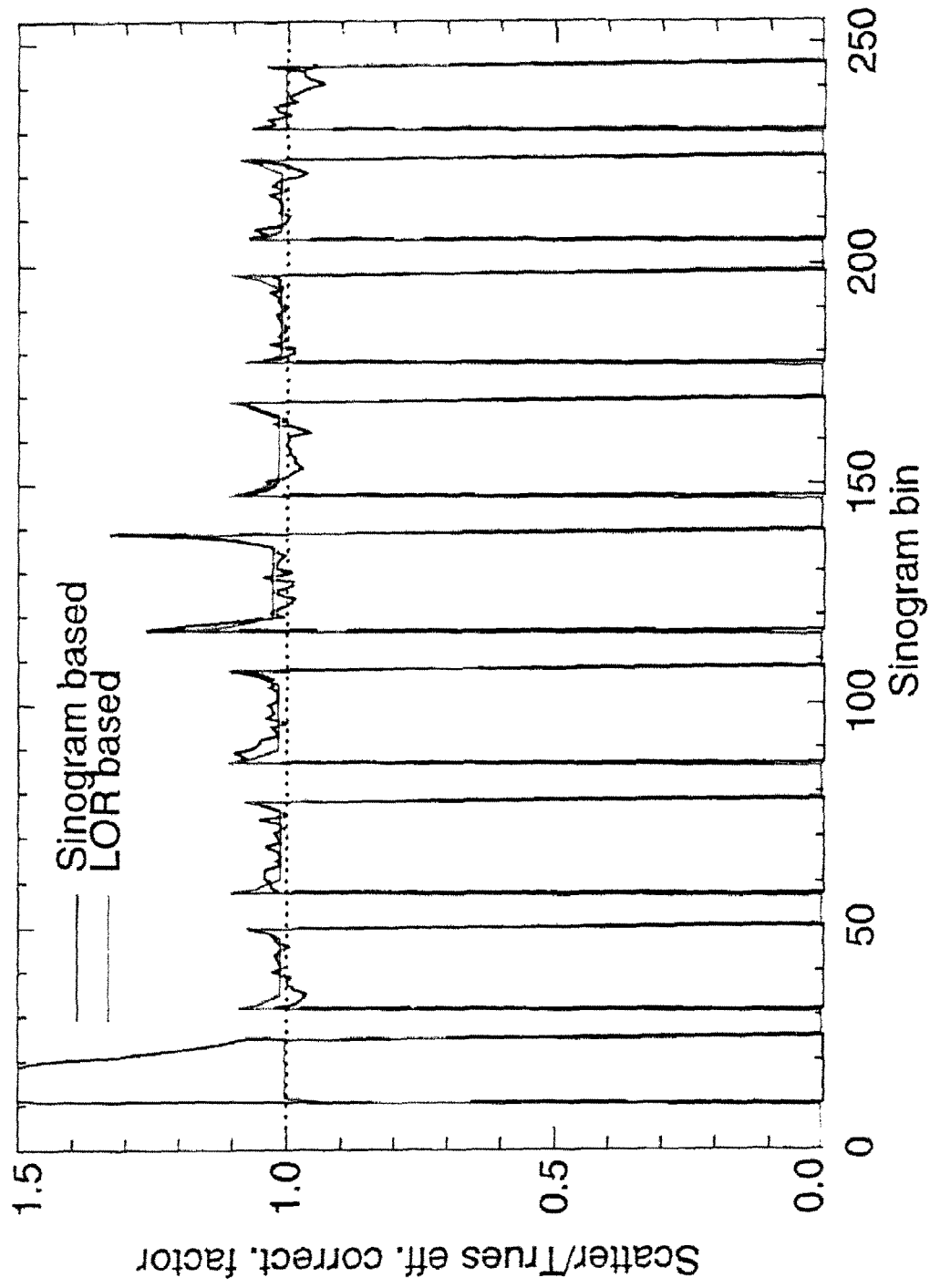
FIG. 11 shows profiles through the scatter/trues efficiency factor sinograms of FIG. 10.

In FIGS. 10 and 11 the results for both the sinogram and LOR based estimates of $\epsilon_C$ are shown for the second slab phantom experiment. These sinograms are averaged over all planes. These estimates seem to show greater effects at the edges of the off-center block diamonds than observed in the first experiment.

Figure 12:
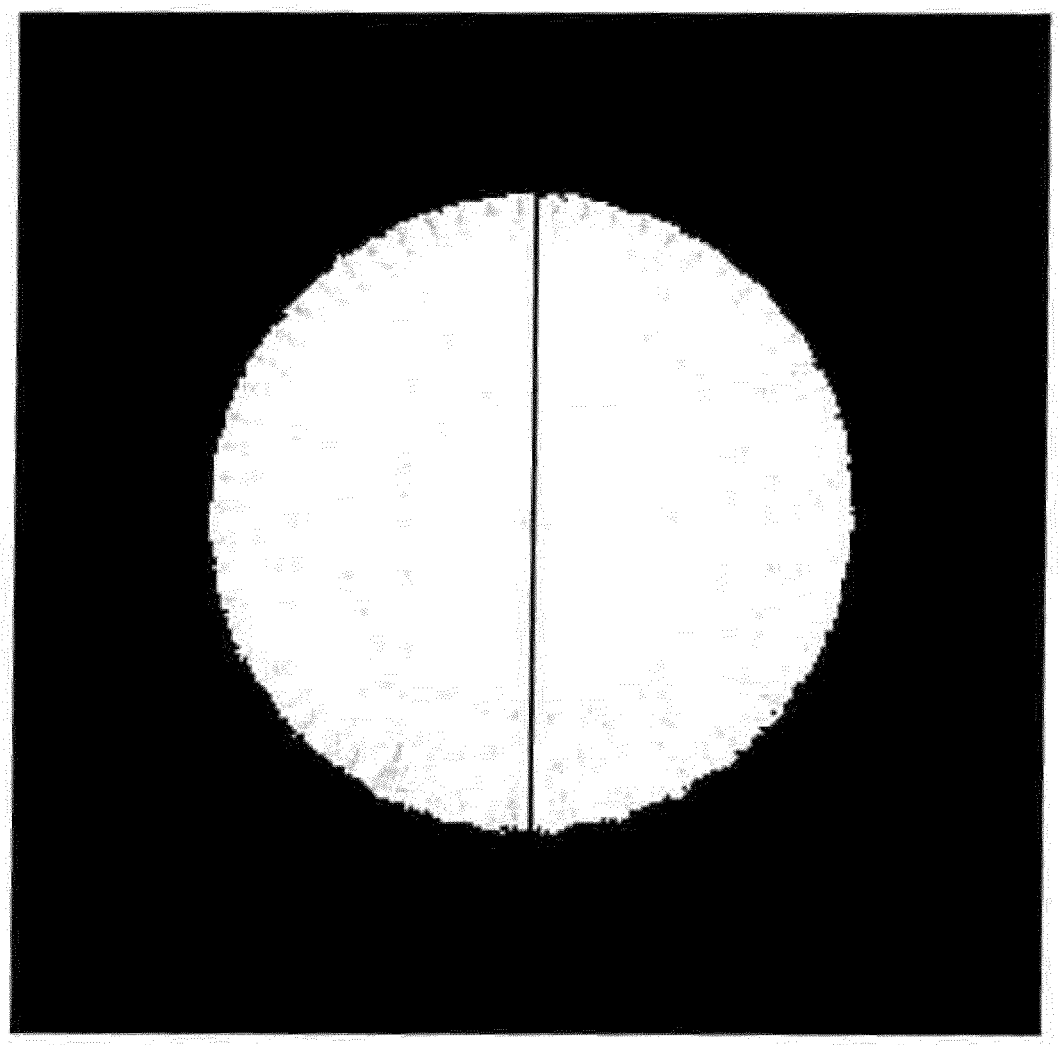
FIG. 12 is an image of a 20 cm diameter cylinder uncorrected for block related scatter/trues efficiency variations; the greyscale has been windowed to enhance contrast.
Figure 13:
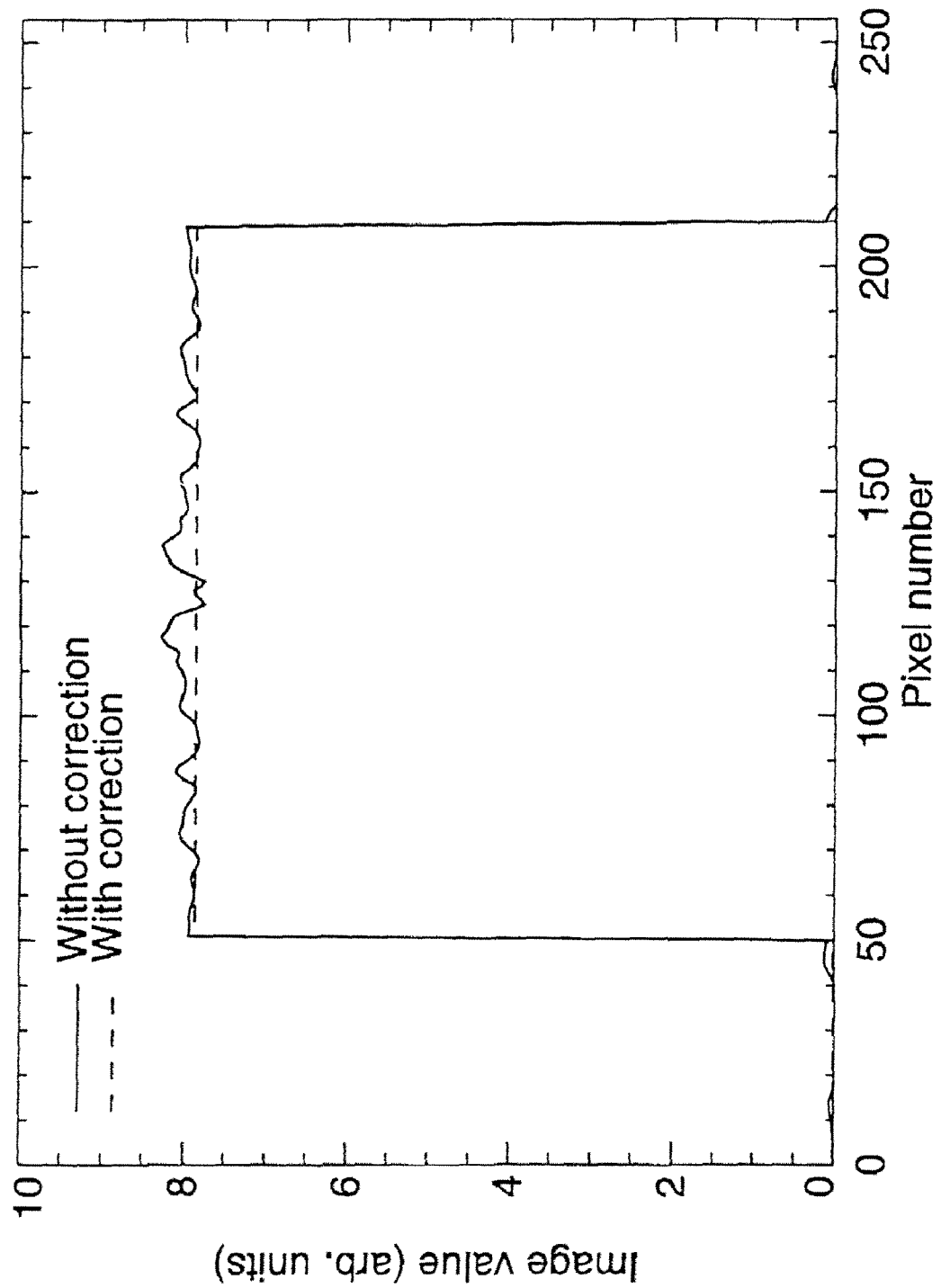
FIG. 13 is a graph showing a profile through the center of the cylinder image of FIG. 12 (solid line) together with a profile through the ideal corrected image (dashed line)

The model of an uncompensated image, $I_{\epsilon_C}$, averaged over all planes is shown in FIG. 12. The symmetry in the artifacts corresponds to the 32 detectors per ring. The structure varies somewhat from plane to plane. A profile through the center of this image is shown in FIG. 13. The maximum peak-to-valley variation for the artifacts here is about 6% relative to the mean, but it may be as high as 10% in individual planes.

Figure 7:
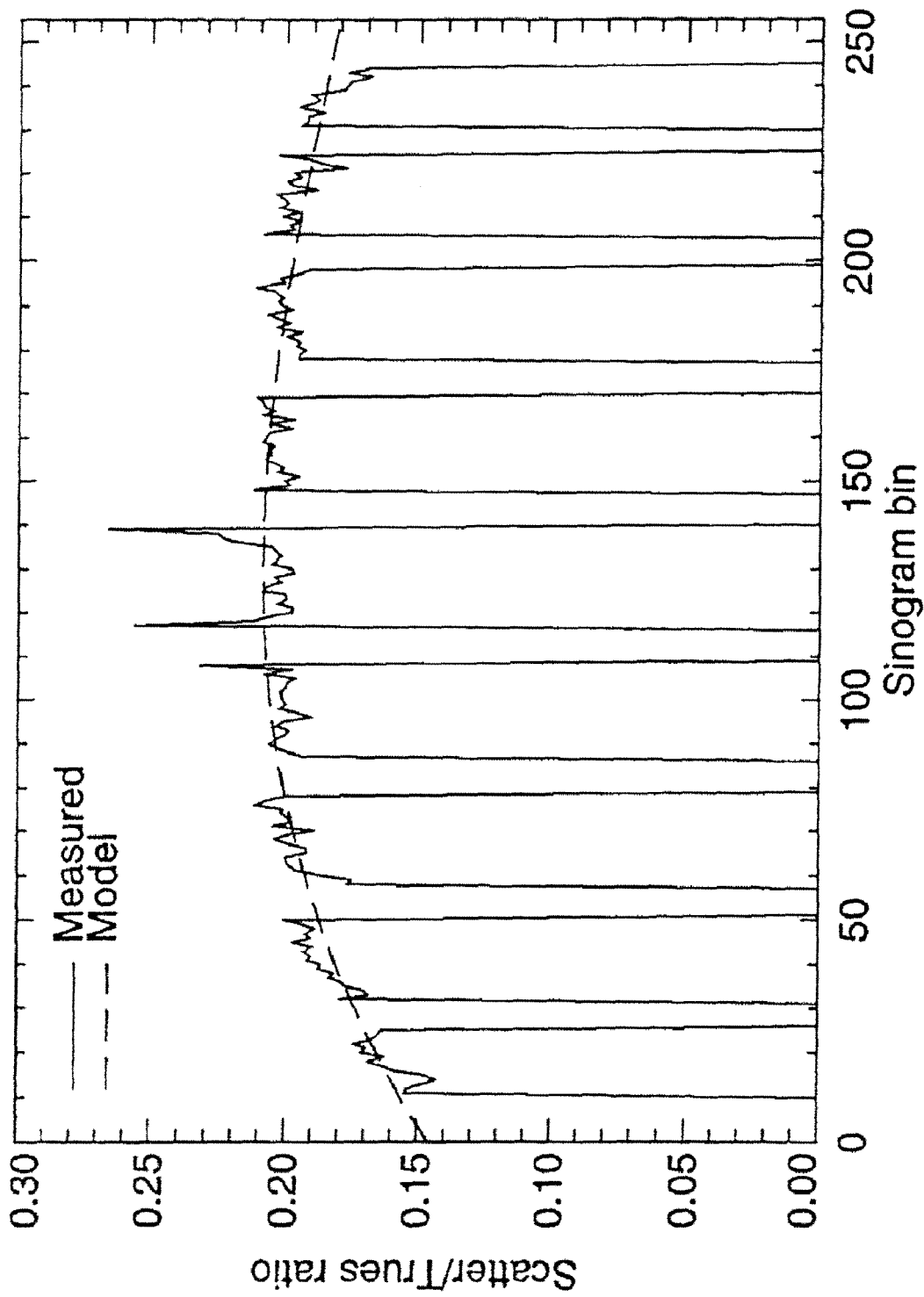
FIG. 7 is a central row through scatter/trues ratio sinogram with smooth model.

The sinogram profiles in FIG. 5 suggest significant geometric efficiency variations in both the trues and scatter data. Interestingly, these variations largely cancel in the $\epsilon_S/\epsilon_T$ ratio, as seen in FIG. 7, leaving only a residual variation around the block-block coincidence diamonds nearest the center of the FOV as indicated by the bright rims around these diamonds in FIG. 6. These LORs typically involve edge crystals in the detector blocks opposing each other most directly across the center of the ring. The enhanced scatter/trues efficiencies for these LORs appears to be a consequence of the fact that the trues efficiency falls off more rapidly toward the edges of the blocks than does the scatter efficiency. This is confirmed by the simulation results in FIG. 9. A photon entering an edge crystal normally and undergoing Compton scatter may have a significant solid angle for escape through the gaps between blocks. It is believed that scatter may be less susceptible to this effect since it has distributed incidence angles.

The agreement between the measured and simulation derived scatter/trues efficiency correction factors in FIG. 8, confirms that the observed variation is not simply a count rate dependent pile-up effect, for example. The LOR-based technique for estimating the $\epsilon_S$ essentially eliminates noise by limiting the number of distinct LOR types considered. As can be seen, the agreement between the LOR based and sinogram based estimates in FIGS. 10 and 11 appears reasonable.

From the image example of FIGS. 12 and 13, it is estimated that the amplitude of the artifacts in an uncompensated image may be a few percent for the scanner examined. Consequently, they are potentially visible in long, low noise scans, and a correction for them is warranted. In the past, we have not observed similar artifacts on clinical whole body PET scanners with larger ring diameters and small gaps between block detectors. Preliminary simulations of other scanner designs also seem to suggest that the effect is reduced for smaller block gaps. On the other hand, our results suggest it would be prudent to characterize the scatter/trues geometric efficiency variation for scanners having discontinuous or non-uniform detector arrangements.

Figure 14A:
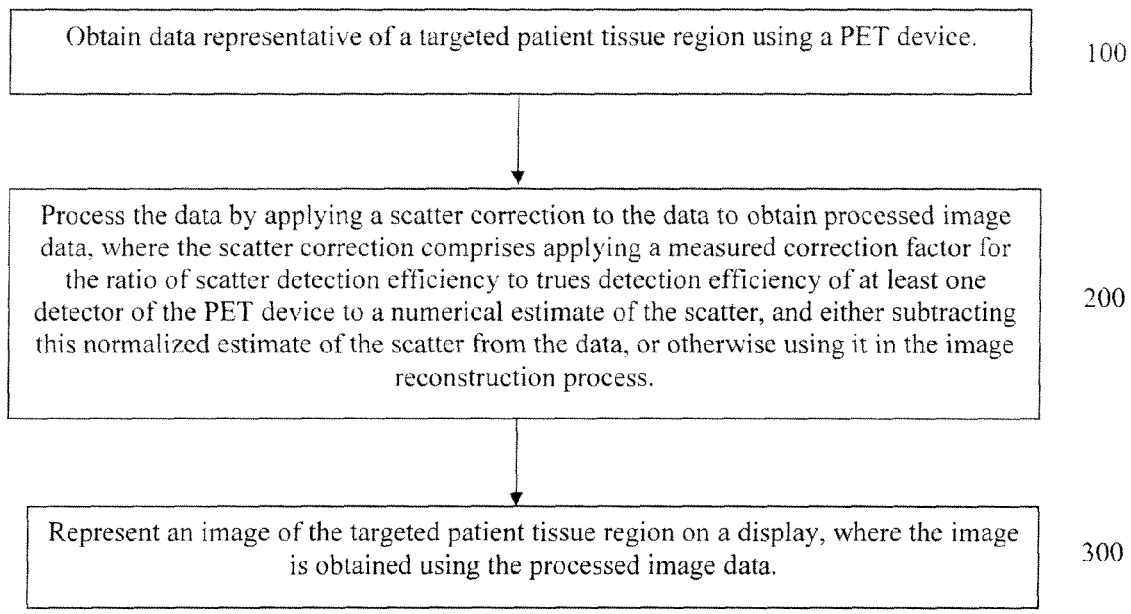
FIGS. 14A and 14B are flowcharts illustrating exemplary steps for performing the disclosed method.
Figure 14B:
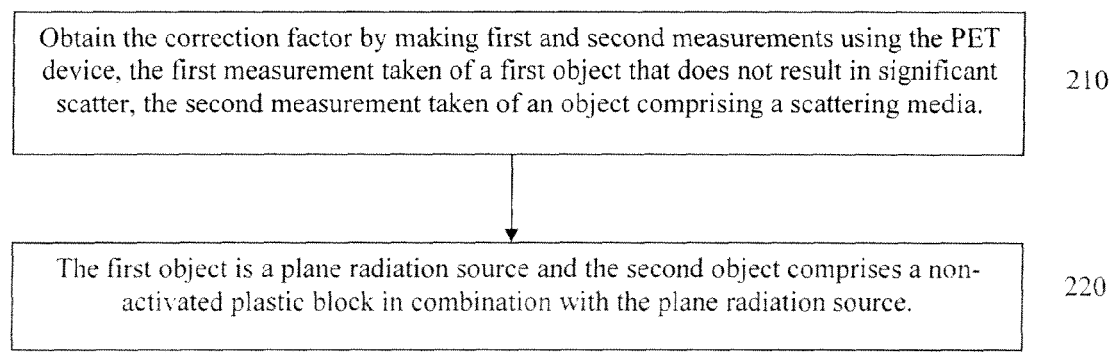

Referring now to FIGS. 14A-14B, the disclosed method will be described in greater detail. At step 100, data representative of a targeted patient tissue region is obtained using a positron emission tomography (PET) device. At step 200, the data is processed by applying a scatter correction to the data to obtain processed image data, where the scatter correction comprises applying a measured correction factor for the ratio of scatter detection efficiency to trues detection efficiency of at least one detector of the PET device to a numerical estimate of the scatter, and then subtracting this normalized estimate of the scatter from the data, or otherwise using it in the reconstruction process. At step 300, an image of the targeted patient tissue region is represented on a display, where the image is obtained using the processed image data.

At step 210 (FIG. 14B), the correction factor is obtained by making first and second measurements using the PET device, the first measurement being taken of a first object that does not result in significant scatter, and the second measurement being taken of an object comprising a scattering media. The first object may be a plane radiation source and the second object comprises non-activated plastic blocks in combination with the plane radiation source (step 220).

The correction factor may be determined from the formula:

$$\epsilon_C = \left(\frac{M_2}{e^{-\mu \Delta x} M_1} - 1\right) \bigg/ \left[\frac{\epsilon_S}{\epsilon_T}\left(\frac{S}{e^{-\mu \Delta x} T}\right)\right]_{model}.$$

where: $\epsilon_C$—scatter/trues efficiency correction factor; $M_1$—measurement with plane source; $M_2$—measurement with scatter media added; $\Delta x$—total thickness of the scatter media; $\mu$—linear attenuation coefficient of the scatter media; $\epsilon_S$—detection efficiency of scatter; $\epsilon_T$ detection efficiency of trues; S—incident scatter radiation; and T—incident trues radiation.

The correction factor may comprise a sinogram-based estimate obtained by histogramming the data obtained from the first and second measurements into sinograms and summing the sinograms. In addition, the correction factor may be obtained by replicating a portion of the summed sinogram to obtain a quasi-uniform sinogram.

Alternatively, the correction factor may comprise a line of response (LOR)-based estimate obtained from LOR data obtained from the first and second measurements. The LOR data may be averaged over all detector pairs of the PET device having the same radial and axial offsets.

The correction factor may comprise a sinogram applied to the data as an independent normalization of a single scatter estimation (SSS) scatter sinogram. The correction factor may compensate for scatter detection efficiency variations due to respective gaps between a plurality of detectors of the PET device.

The method described herein may be automated by, for example, tangibly embodying a program of instructions upon a computer readable storage media capable of being read by machine capable of executing the instructions. A general purpose computer is one example of such a machine. A non-limiting exemplary list of appropriate storage media well known in the art would include such devices as a readable or writeable CD, flash memory chips (e.g., thumb drives), various magnetic storage media, and the like.

The features of the method have been disclosed, and further variations will be apparent to persons skilled in the art. Such variations are considered to be within the scope of the appended claims. Reference should be made to the appended claims, rather than the foregoing specification, as indicating the true scope of the disclosed method.

The functions and process steps herein may be performed automatically or wholly or partially in response to user command. An activity (including a step) performed automatically is performed in response to executable instruction or device operation without user direct initiation of the activity.

The systems and processes disclosed herein are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The processes and applications may, in alternative embodiments, be located on one or more (e.g., distributed) processing devices accessing a network linking the elements of FIG. 1. Further, the functions and steps of the disclosed method may be implemented in hardware, software or a combination of both and may reside on one or more processing devices located at a location of a network linking the elements of FIG. 1 or another linked network, including the Internet.

What is claimed is:

1. A method for processing medical imaging emission data, comprising:

obtaining data representative of a targeted patient tissue region using a positron emission tomography (PET) device;

processing the data by applying a scatter correction to the data to obtain processed image data, where the scatter correction comprises applying a measured correction factor for the ratio of scatter detection efficiency to trues detection efficiency of at least one detector of the PET device to a numerical estimate of the scatter, and either: (a) subtracting this normalized estimate of the scatter from the data, or (b) otherwise using the normalized estimate of the scatter in an image reconstruction process; and representing an image of the targeted patient tissue region on a display, wherein the image is obtained using the processed image data, wherein the correction factor comprises a sinogram applied to the data as an independent normalization of a single scatter estimation (SSS) sinogram.

2. The method of claim 1, wherein the correction factor is obtained by making first and second measurements using the PET device, the first measurement being taken of a first object that does not result in significant scatter, and the second measurement being taken of an object comprising a scattering media.

3. The method of claim 2, wherein the first object is a plane radiation source and the second object comprises non-activated plastic blocks in combination with the plane radiation source.

4. The method of claim 3, wherein the correction factor is determined from the following formula:

$$\epsilon_C = \left(\frac{M_2}{e^{-\mu\Delta x}M_1} - 1\right) \bigg/ \left[\frac{\epsilon_S}{\epsilon_T}\left(\frac{S}{e^{-\mu\Delta x}T}\right)\right]_{model}.$$

where:
$\epsilon_C$—scatter/trues efficiency correction factor
$M_1$—measurement with plane source
$M_2$—measurement with scatter media added
$\Delta x$—total thickness of the scatter media
$\mu$—linear attenuation coefficient of the scatter media
$\epsilon_S$—detection efficiency of scatter
$\epsilon_T$—detection efficiency of trues
S—incident scatter radiation
T—incident trues radiation.

5. The method of claim 2, wherein the correction factor comprises a sinogram-based estimate obtained by histogramming the data obtained from the first and second measurements into sinograms and summing the sinograms.

6. The method of claim 5, wherein the correction factor is obtained by replicating a portion of the summed sinogram to obtain a quasi-uniform sinogram.

7. The method of claim 2, wherein the correction factor comprises a line of response (LOR)-based estimate obtained from LOR data obtained from the first and second measurements.

8. The method of claim 7, wherein the LOR data is averaged over all detector pairs of the PET device having the same radial and axial offsets.

9. The method of claim 1, wherein the correction factor compensates for variations in scatter detection efficiencies due to respective gaps between a plurality of detectors of the PET device.

10. A system for processing medical imaging emission data, comprising an imaging system including a PET device having a plurality of detectors, a processing unit connected to and in communication with the imaging system and display, and a machine-readable storage medium encoded with a computer program code such that, when the computer program code is executed by a processor, the processor performs a method comprising:
obtaining data representative of a targeted patient tissue region using the PET device; and
processing the data by applying a scatter correction to the data to obtain processed image data, where the scatter correction comprises applying a measured correction factor for the ratio of scatter detection efficiency to trues detection efficiency of at least one detector of the plurality of detectors to a numerical estimate of the scatter, and either: (a) subtracting this normalized estimate of the scatter from the data, or (b) otherwise using it in the reconstruction process,
wherein the correction factor comprises a sinogram applied to the data as an independent normalization of a single scatter estimation (SSS) sinogram.

11. The system of claim 10, further comprising representing an image of the targeted patient tissue region on the display, wherein the image is obtained using the processed image data.

12. The system of claim 10, wherein when the computer program code is executed by a processor, the processor further performing a step of making a first measurement and a second measurement using the PET device to obtain the correction factor, the first measurement being taken of a first object that does not result in significant scatter, and the second measurement being taken of an object comprising a scattering media.

13. The system of claim 12, wherein the first object is a plane radiation source and the second object comprises non-activated plastic blocks in combination with the plane radiation source.

14. The system of claim 13, wherein the correction factor is determined from the following formula:

$$\epsilon_C = \left(\frac{M_2}{e^{-\mu\Delta x}M_1} - 1\right) \bigg/ \left[\frac{\epsilon_S}{\epsilon_T}\left(\frac{S}{e^{-\mu\Delta x}T}\right)\right]_{model}.$$

where:
$\epsilon_C$—scatter/trues efficiency correction factor
$M_1$—measurement with plane source
$M_2$—measurement with scatter media added
$\Delta x$—total thickness of the scatter media
$\mu$—linear attenuation coefficient of the scatter media
$\epsilon_S$—detection efficiency of scatter
$\epsilon_T$—detection efficiency of trues
S—incident scatter radiation
T—incident trues radiation.

15. The system of claim 12, wherein the correction factor comprises a sinogram-based estimate obtained by histogramming the data obtained from the first and second measurements into sinograms and summing the sinograms.

16. The system of claim 15, wherein the correction factor is obtained by replicating a portion of the summed sinogram to obtain a quasi-uniform sinogram.

17. The system of claim 12, wherein the correction factor comprises a line of response (LOR)-based estimate obtained from LOR data obtained from the first and second measurements.

18. The system of claim 17, wherein the LOR data is averaged over all detector pairs of the PET device having the same radial and axial offsets.

19. The system of claim 10, wherein the correction factor compensates for variations in scatter detection efficiencies due to respective gaps between a plurality of detectors of the PET device.

* * * * *